United States Patent
Noh

(10) Patent No.: US 7,160,648 B2
(45) Date of Patent: Jan. 9, 2007

(54) POLYMER ELECTROLYTE COMPOSITION FOR IMPROVING OVERCHARGE SAFETY AND LITHIUM BATTERY USING THE SAME

(75) Inventor: Hyeong-Gon Noh, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 47 days.

(21) Appl. No.: 11/013,705

(22) Filed: Dec. 17, 2004

(65) Prior Publication Data

US 2005/0158633 A1   Jul. 21, 2005

Related U.S. Application Data

(62) Division of application No. 10/277,679, filed on Oct. 23, 2002, now Pat. No. 6,849,362.

(30) Foreign Application Priority Data

Nov. 24, 2001   (KR) ................. 2001-73571

(51) Int. Cl.
   *H01M 6/18*   (2006.01)
(52) U.S. Cl. .................. 429/307; 429/303; 429/317; 429/314; 429/310; 429/338; 429/342; 429/339
(58) Field of Classification Search ............. 429/307, 429/303, 317, 314, 310, 311, 338, 342, 337, 429/340
   See application file for complete search history.

(56) References Cited

U.S. PATENT DOCUMENTS

| 5,580,684 | A | 12/1996 | Yokoyama et al. |
| 5,709,968 | A | 1/1998 | Shimizu |
| 5,763,119 | A | 6/1998 | Adachi |
| 5,776,627 | A | 7/1998 | Mao et al. |
| 5,858,573 | A | 1/1999 | Abraham et al. |
| 6,194,098 | B1 | 2/2001 | Ying et al. |
| 6,277,514 | B1 | 8/2001 | Ying et al. |

FOREIGN PATENT DOCUMENTS

JP   2000-268866   9/2000

OTHER PUBLICATIONS

"*Notice to Submit Response*" issued by Korean Intellectual Property Office dated on Aug. 22, 2003.

*Primary Examiner*—Laura Weiner
(74) *Attorney, Agent, or Firm*—Robert E. Bushnell, Esq.

(57) ABSTRACT

A polymer electrolyte composition for improving overcharge safety and a lithium battery using the same are provided. The polymer electrolyte composition includes acrylate, epoxy or isocyanate at both of its terminals, and includes a compound containing an aromatic group such as thiophene, biphenyl or furan in an amount of 0.1% to 20% by weight based on the amount of the overall organic electrolytic solution. The polymer electrolyte composition further includes at least one of polyethylene glycol diacrylate (PEGDA), polyethylene glycol dimethacrylate (PEGDMA), and a mixture thereof. A lithium polymer battery using the polymer electrolyte composition can be suppressed from danger of ignition or explosion when the battery is overcharged due to some uncontrolled conditions, such as failure of a charger. Moreover, an additional cutoff device is not necessary, while still exhibiting good life cycle characteristics of the battery.

30 Claims, 1 Drawing Sheet

POLYMER ELECTROLYTE COMPOSITION FOR IMPROVING OVERCHARGE SAFETY AND LITHIUM BATTERY USING THE SAME

CROSS-REFERENCE TO RELATED APPLICATIONS

This application is a divisional application of U.S. patent application Ser. No. 10/277,679 filed on 23 Oct. 2002 now U.S. Pat No. 6,849,362. This related application is relied on and incorporated herein by references in its entirety.

CLAIM OF PRIORITY

This application makes reference to, incorporates the same herein, and claims all benefits accruing under 35 U.S.C. §119 from my application POLYMER ELECTROLYTE COMPOSITION FOR IMPROVING OVERCHARGE SAFETY AND LITHIUM BATTERY USING THE SAME filed with the Korean Industrial Property Office on 24 Nov. 2001 and there duly assigned Serial No. 2001-73571.

BACKGROUND OF THE INVENTION

1. Technical Field

The present invention relates to a lithium battery and, more particularly, to a polymer electrolyte composition for improving overcharge safety, and a lithium battery using the same.

2. Related Art

According to the development of advanced electronic devices, there is an increasing demand for small, lightweight portable electronic devices and equipment. Thus, there is a need for batteries having high energy density characteristics so as to supply power to such devices and equipment.

A lithium battery comprises a cathode, an anode, an electrolytic solution providing a movement path for lithium ions, and a separator disposed between the cathode and the anode. Lithium batteries produce electrical energy by intercalation/deintercalation of lithium ions during oxidation and reduction occurring at the cathode and the anode. However, in the case where a battery is overcharged due to malfunction of a charger (for example, malfunction causing a sharp rise in voltage), excess lithium is precipitated at the cathode and excess lithium is intercalated into the anode. If both the cathode and the anode are thermally unstable, an organic solvent of the electrolytic solution is decomposed to cause rapid heat generation, such as thermal runaway, adversely affecting safety of the battery.

To overcome the foregoing disadvantage, various attempts to suppress overcharge of a battery by changing the composition of an electrolytic solution or adding additives to the electrolytic solution have been proposed in the field of lithium ion batteries. For example, U.S. Pat. No. 5,580,684 to Yokoyama et al., entitled NON-AQUEOUS ELECTROLYTIC SOLUTIONS AND NON-AQUEOUS ELECTROLYTE CELLS COMPRISING THE SAME, issued on 3 Dec. 1996, discloses a method of improving safety of a battery by increasing a self-extinguishing property of an electrolytic solution by adding phosphoric acid esters, such as trimethyl phosphate, tri(trifluoroethyl)phosphate or tri(2-chloroethyl)phosphate, to the electrolytic solution. U.S. Pat. No. 5,776,627 to Mao et al., entitled AROMATIC MONOMER GASSING AGENTS FOR PROTECTING NON-AQUEOUS LITHIUM BATTERIES AGAINST OVERCHARGE, issued on 7 Jul. 1998, discloses a lithium battery having an internal electrical disconnection device, and comprising a gas generating additive, such as thiophene, biphenyl or furan. When the battery is overcharged, the gas generating additive is polymerized to prevent migration of lithium ions, and the generated gas increases an internal pressure of the battery so that the disconnection device is activated, thereby causing internal shorting prior to explosion.

Similarly, methods for enhancing battery safety are disclosed in U.S. Pat. No. 5,763,119 to Adachi, entitled NON-AQUEOUS ELECTROLYTE SECONDARY CELL HAVING SHUTTLE AGENT, issued on 9 Jun. 1998, U.S. Pat. No. 5,709,968 to Shimizu, entitled NON-AQUEOUS ELECTROLYTE SECONDARY BATTERY, issued on 20 Jan. 1998, and U.S. Pat. No. 5,858,573 to Abraham et al., entitled CHEMICAL OVERCHARGE PROTECTION OF LITHIUM AND LITHIUM-ION SECONDARY BATTERIES, issued on 12 Jan. 1999, in which an electrolyte includes an additive such as 1,2-dimethoxy-4-bromo-benzene, 2-chloro-p-xyline and 4-chloro-anisol, and 2,7-diacetyl thianthrene, respectively.

However, such conventional additives may be polymerized even under normal operating conditions. Also, since additional disconnections are necessary, resultant batteries become bulky. In the case of a lithium polymer battery requiring a large amount of additives, life cycle characteristics may deteriorate.

SUMMARY OF THE INVENTION

To solve the above-described problems, it is a first object of the present invention to provide a polymer electrolyte composition which can suppress danger of ignition or explosion of a battery when the battery is overcharged due to some uncontrolled conditions, such as failure of a charger without need for an additional cutoff device, while not deteriorating the life cycle characteristics of the battery.

It is a second object of the present invention to provide a lithium secondary battery using the polymer electrolyte composition.

To accomplish the first object, the present invention provides a polymer electrolyte composition comprising an organic solvent, a lithium salt and an aromatic compound of formula (1):

    <Formula (1)> wherein
$Y_1, Y_2 =$

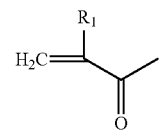

where $R_1$ is hydrogen or alkyl,

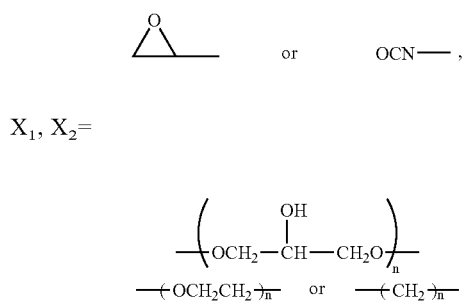 or OCN—, $X_1, X_2=$

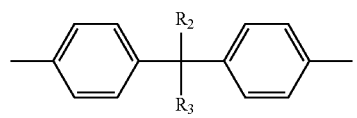

—(OCH$_2$CH$_2$)$_n$— or —(CH$_2$)$_n$— where n is an integer in the range of 0 to 20,
Ar=

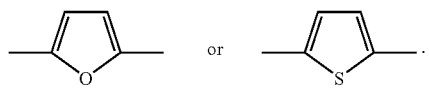

where $R_2$ and $R_3$ are independently hydrogen or alkyl.

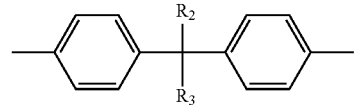 or 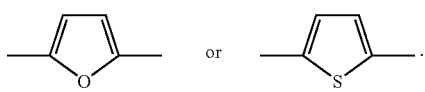.

In accordance with another aspect of the present invention, there is provided a lithium secondary battery using the polymer electrolyte composition.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE INVENTION

Figure 1:
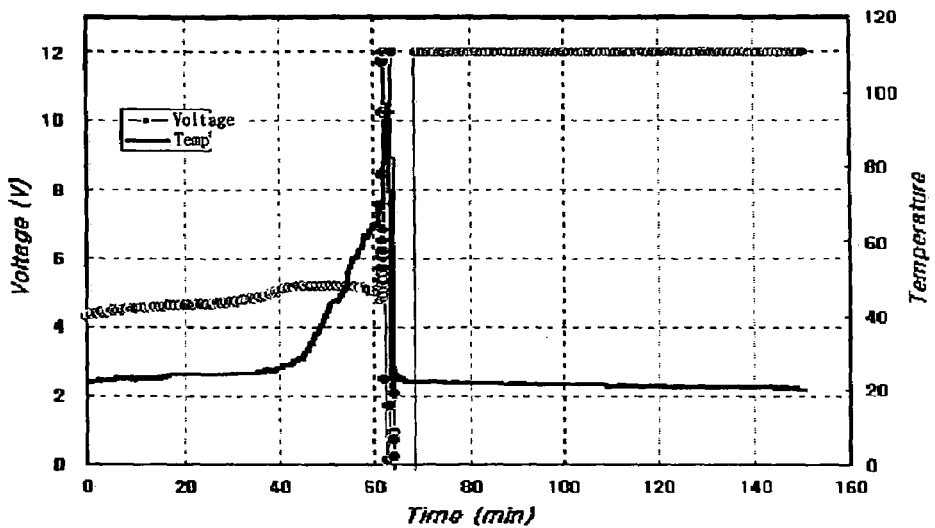
FIG. 1 is a graph showing the results of an overcharge test for a battery using a polymer electrolyte composition according to Comparative Example 1.

The present invention will now be described in detail.

A polymer electrolyte composition according to the present invention comprises an organic solvent, a lithium salt and an aromatic compound of formula (1):

$Y_1$—$X_1$—Ar—$X_2$—$Y_2$          <Formula (1)> wherein
$Y_1, Y_2=$

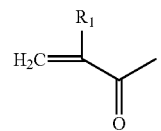

where $R_1$ is hydrogen or alkyl,

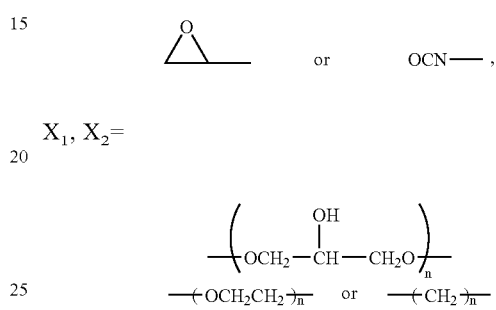 or OCN—, $X_1, X_2=$

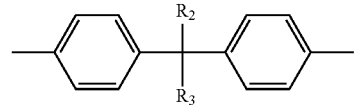

—(OCH$_2$CH$_2$)$_n$— or —(CH$_2$)$_n$— where n is an integer in the range of 0 to 20,
Ar=

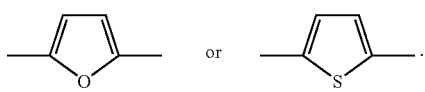

where $R_2$ and $R_3$ are independently hydrogen or alkyl.

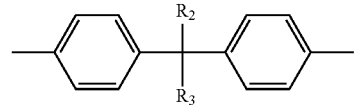 or 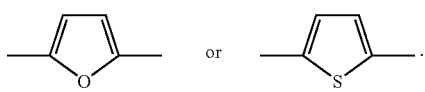.

When the battery is overcharged so as to result in an increase in internal voltage up to 4.2 V, the compound of formula (1) is polymerized by electrical polymerization to increase the internal resistance of the battery, thereby protecting the battery by cutting off the conduction of lithium ions, and improving overcharge safety. Since the compound of formula (1) includes acrylate, epoxy or isocyanate group at both of its terminals, it can be gelled by heat polymerization and UV light polymerization.

According to the present invention, the compound of formula (1) is preferably used in an amount of 0.1% to 20% by weight based on the amount of the overall organic electrolytic solution. If the content of the compound is less than 0.1%, the shortage gives rise to a poor function of preventing overcharge. If the content of the compound is greater than 20%, the excess adversely affects battery performance. Usable examples of the compound of formula (1) include bisphenol A ethoxylate($_1$E$_O$/phenol) diacrylate of formula (2) having acrylate groups at its both terminals, and an aromatic group of bisphenol disposed at its center:

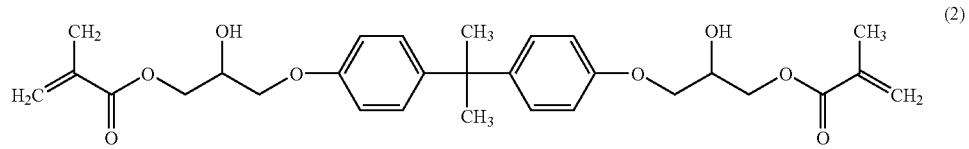

Also, the compound of formula (1) may be a compound of formula (3):

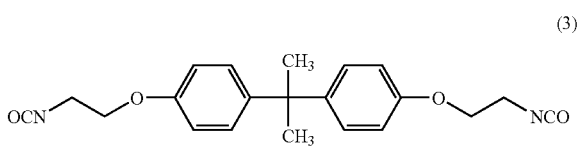

If a crosslinking agent such as amine, is added to the compound of formula (3), the isocyanate groups at both of the terminals are crosslinked, thereby forming a urethane gel. The aromatic compound of formula (1) may be a compound of formula (4):

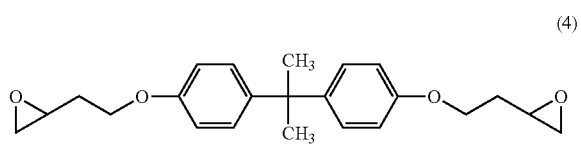

If a crosslinking agent, such as amine, is added to the compound of formula (4), the epoxy groups at both terminals are crosslinked, thereby forming an epoxy gel.

As the organic solvent for use in the polymer electrolyte composition, any organic solvent typically used for the manufacture of lithium batteries can be used. Examples of organic solvents useful in the present invention include, but are not limited to, at least one selected from the group consisting of ethylene carbonate, propylene carbonate, dimethylcarbonate, diethylcarbonate, ethyhnethylcarbonate, tetrahydrofuran, sulforan and 2-methylhydrofuran. The solvent is present in an effective amount typically used in lithium polymer batteries.

As the lithium salt for use in the polymer electrolyte composition, any lithium salt that is dissociated in an organic solvent so as to be capable of producing lithium ions can be used. Examples of lithium salts useful in the present invention include, but are not limited to, at least one ionic lithium salt selected from the group consisting of $LiPF_6$, $LiClO_4$, $LiAsF_6$, $LiBF_4$, $LiCF_3SO_3$, $LiN(CF_3SO_2)_2$, LiSCN and $LiC(CF_3SO_2)_3$, and the lithium salt is preferably present in a concentration of 0.4 to 1.5 M.

The polymer electrolyte composition according to the present invention may further include at least one selected from the group consisting of polyethylene glycol diacrylate (PEGDA), polyethylene glycol dimethacrylate (PEGDMA) and a mixture thereof. Such polymers can form a copolymer with the compounds of formulas 1 thru 4, and they improve the mechanical properties of a polymeric gel by crosslinkage and increase the amount of moisture which the polymer electrolyte is able to incorporate therein.

The PEGDA, PEGDMA or a mixture thereof is, preferably, added in an amount of 10.1% to 10% by weight based on the amount of the overall polymer electrolyte composition. If the content is less than 0.1%, such desired effects as described above are not achieved. If the content is greater than 10%, the excess may adversely affect ionic conductivity.

In an embodiment of the present invention, the PEGDMA is an oligomer having a weight-average molecular weight of 200 to 10000, and the number of ethylene oxides contained in the oligomer is, preferably, 3 to 20.

In another embodiment of the present invention, the PEGDMA is an oligomer having a weight-average molecular weight of 200 to 10000, and the number of ethylene oxides contained in the oligomer is, preferably, 3 to 20.

The polymer electrolyte composition according to the present invention may further include a polymeric filler, and usable examples of the filler for improving mechanical strength of polymer electrolyte include silica, kaolin, alumina and the like.

Also, the polymer electrolyte composition according to the present invention may further include a plasticizer. Examples of the plasticizer useful in the present invention include ethylene glycol derivatives, oligomers thereof and organic carbonates. Specific examples of the ethylene glycol derivatives are ethylene glycol diacetate, ethylene glycol dibutylether, ethylene glycol dibutyrate, ethylene glycol dipropionate, propylene glycol methylether acetate and mixtures thereof. Specific examples of the organic carbonates are ethylene carbonate, propylene carbonate, diethyle carbonate, dimethyl carbonate and mixtures thereof.

A lithium battery according to the present invention includes a cathode, an anode and a polymer electrolyte composition comprising an aromatic compound of formula (1).

The lithium battery according to the present invention may further include a porous separator, and any separator typically used in lithium batteries can be used without limitations. For example, a porous polyethylene or polypropylene film less reactive with an organic solvent, and suitable in view of safety, can be used as the separator.

A method of preparing a lithium battery according to the present invention will now be described in detail with reference to particular embodiments, but the invention is not limited thereto.

First, the polymer electrolyte composition according to the present invention is applied to an electrode or separator to form an electrode assembly. Then, the electrode assembly is put into a battery case, followed by polymerization, thereby preparing a lithium battery. The composition is gelled by heat polymerization or UV light polymerization.

The lithium battery according to the present invention is not limited in view of type, and the present invention can be applied to both primary and secondary batteries.

To further illustrate the present invention in greater detail, the following Examples will be given. However, it is to be understood that the present invention is not restricted thereto.

EXAMPLE 1

1-(1) Preparation of Cathode

A mixture (slurry or paste), prepared by dissolving $LiCoO_2$ employed as a cathode active material, Super-P (manufactured by M.M.M. Corp.) employed as a conductive agent, and polyvinylidenefluoride (PVDF) employed as a binder in N-methyl-2-pyrrolidone (NMP) employed as an organic solvent, was uniformly applied onto both surfaces of an aluminum current collector to prepare a cathode coated with an active material, followed by drying to remove the organic solvent and compression molding using a roll press machine, thereby manufacturing a cathode of 4.9 cm in width and 147 μm in thickness.

1-(2) Manufacture of Anode

A mixture (slurry or paste), prepared by dissolving mesocarbon fiber (MCF) (manufactured by Petoca Ltd.) employed as an anode active material and PVDF employed as a binder in NMP employed as an organic solvent, was applied onto both surfaces of a copper current collector to prepare an anode coated with an active material, followed by drying to remove the organic solvent and compression molding using a roll press machine, thereby manufacturing an anode of 5.1 cm in width and 178 μm in thickness.

1-(3) Preparation of Polymer Electrolyte Composition $LiPF_6$ as a lithium salt was dissolved in a concentration of 1.15M in a mixed solvent of ethylene carbonate (EC)/dimethyl carbonate (DMC)/diethyl carbonate (DEC) (volume ratio=3/3/4) to obtain a mixed solution. To 100 g of the obtained mixed solution, there were added 4 g of bisphenol A ethoxylate($_1E_0$/phenol) diacrylate of formula (2) (manufactured by Aldrich), 3 g of 3-chloroanisole as a polymerization catalyst during overcharge, and 0.1 g of benzoylperoxide as a catalyst, thereby obtaining a desired polymer electrolyte composition:

EXAMPLE 2

The polymer electrolyte composition was prepared in the same manner as in Example 1 except that 2 g of bisphenol A ethoxylate($_1E_0$/phenol) diacrylate was used.

EXAMPLE 3

The polymer electrolyte composition was prepared in the same manner as in Example 1 except that 6 g of bisphenol A ethoxylate($_1E_0$/phenol) diacrylate was used.

EXAMPLE 4

The polymer electrolyte composition was prepared in the same manner as in Example 1 except that 2 g of bisphenol A ethoxylate($_1E_0$/phenol) diacrylate and 2 g of PEGDMA, having a weight-average molecular weight of 550 (manufactured by Aldrich), were used.

EXAMPLE 5

The polymer electrolyte composition was prepared in the same manner as in Example 1 except that 2 g of bisphenol A ethoxylate($_1E_0$/phenol) diacrylate and 2 g of PEGDMA, having a weight-average molecular weight of 575, were used.

EXAMPLE 6

Manufacture of Lithium Polymer Battery

An 18 μm thick, porous polyethylene separator was interposed between the cathode and the anode manufactured in Example 1 and wound to prepare a battery assembly. Then, the polymer electrolyte compositions obtained in Examples 1 thru 5 were injected into a plurality of such battery assemblies in each amount of 2.9 g to manufacture rectangular batteries, each having a capacity of 900 mAh, followed by gelling through heat polymerization. The heat polymerization was performed at 85° C. for 3 hours.

COMPARATIVE EXAMPLE 1

$LiPF_6$ was dissolved in a concentration of 1.15M in a mixed solvent of EC/DMC/DEC (volume ratio=3/3/4) to obtain a mixed solution. To 100 g of the obtained mixed solution were added 4 g of PEGDMA to prepare a polymer electrolyte composition.

COMPARATIVE EXAMPLE 2

The polymer electrolyte composition was prepared in the same manner as in Comparative Example 1 except that 4 g of PEGDA was used instead of PEGDMA.

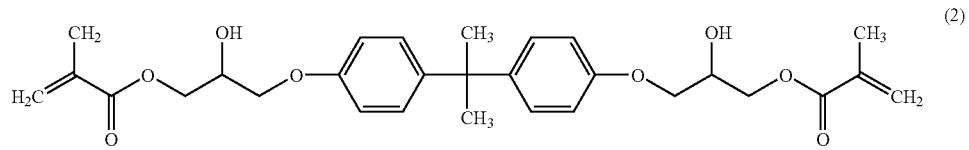

(2)

TEST EXAMPLE 1

Overcharge Test

Figure 2:
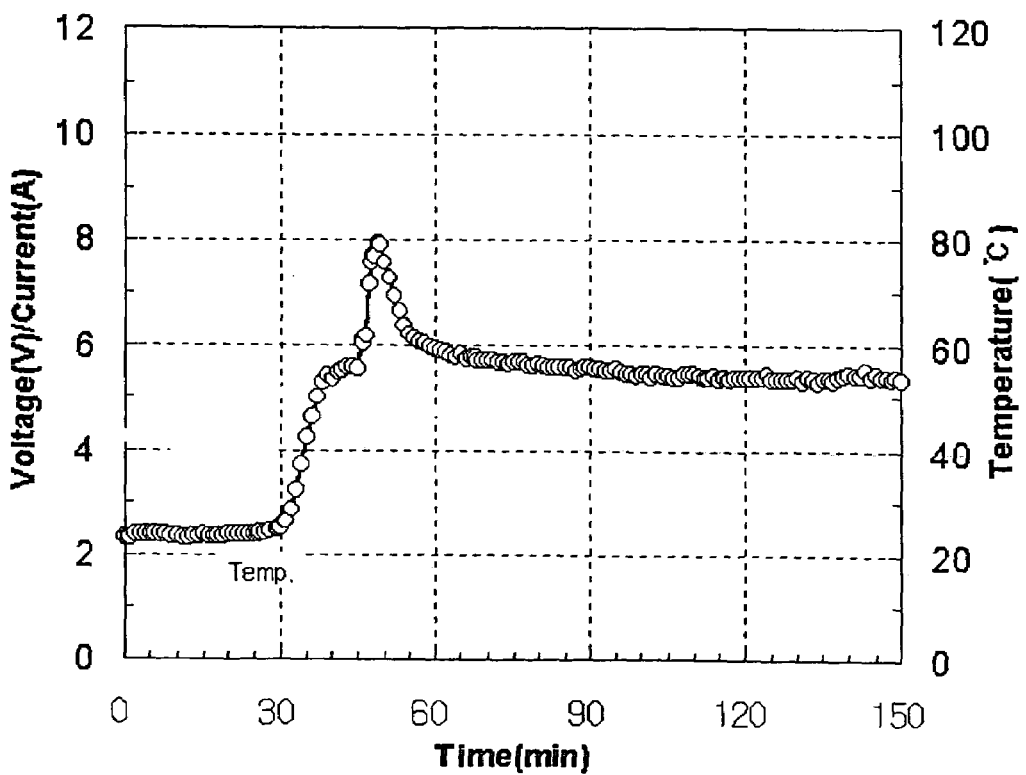
FIG. 2 is a graph showing the results of an overcharge test for a battery using a polymer electrolyte composition according to Example 1 of the present invention.

Lithium polymer batteries using the polymer electrolyte composition obtained in Example 1 and in Comparative Example 1, respectively, were charged at room temperature with a charging current of 500 mA (1 C) up to 4.1 V, and were further charged with a constant voltage of 4.1 V for 3 hours, realizing a fully charged state of the battery. Charging current of 500 mA (1 C) was applied between the cathode and anode terminals of the fully charged battery to be overcharged. Then, a time period from an initial stage of the overcharge to a point when a current cutoff member operates, and a highest battery temperature at those timings, were measured, and the results thereof are shown in FIGS. 1 and 2. FIG. 1 shows that the battery is ignited due to thermal runaway. However, in the lithium polymer battery according to the present invention, as shown in FIG. 2, even though a high voltage of greater than 4.2 V is applied thereto, the voltage is never increased up to 6 V or more, thereby preventing ignition due to thermal runaway.

TEST EXAMPLE 2

Discharge Capacity Test

The initial discharge capacities and capacity changes after 300 cycles of charging/discharging of the manufactured lithium polymer batteries prepared in Example 1–5 and in Comparative Examples 1–2 were measured, and the results are expressed as values relative to the initial capacities. A charger/discharger (Maccor Co.) having a capacity of 1 A was used. The charging and discharging cycling test was performed at 25° C. at a rate of 1 C, and the charging voltage was 2.75 to 4.2 V. The results are shown in Table 1.

TABLE 1

| | Average standard discharge capacity (mAh) | Average high-rate (2C) discharge capacity (mAh) | Average (1C) discharge capacity (mAh) |
|---|---|---|---|
| Example 1 | 523 | 420 | 450 |
| Example 2 | 513 | 410 | 440 |
| Example 3 | 526 | 400 | 425 |
| Example 4 | 505 | 440 | 459 |
| Example 5 | 501 | 440 | 413 |
| Comparative Example 1 | 530 | 444 | 467 |
| Comparative Example 2 | 527 | 445 | 471 |

From Table 1, it is clear that the lithium polymer batteries using the polymer electrolyte compositions according to the present invention are greatly improved in suppressing overcharge and exhibit stable charge/discharge characteristics.

When an internal voltage of a battery increases over 4.2 V due to overcharge resulting from various causes, the polymer electrolyte composition according to the present invention forms electrical polymers in the electrolyte, thereby increasing internal resistance of the battery and preventing conduction of lithium ions. Thus, the battery can be protected from danger of ignition or explosion, and overcharge safety can be improved. Also, since the battery of the present invention does not require a separate current cutoff device incorporated in a conventional battery, various advantages, including reduction in battery size and manufacturing cost, can be achieved.

The aromatic compound included in the composition of the present invention has a high ionic conductivity in itself. Thus, even if a large amount of the aromatic compound is used, there is no deterioration in charge/discharge characteristics and life span characteristics of the battery, and the aromatic compound contained in the polymer electrolyte of the present invention can be advantageously applied to lithium polymer batteries and the like.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. A polymer electrolyte composition, comprising:
   an organic solvent;
   a lithium salt; and
   an aromatic compound of Formula (3):

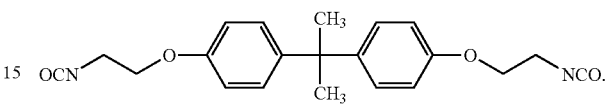

(3)

2. The polymer electrolyte composition according to claim 1, wherein the aromatic compound is included in an amount in a range of 0.1% to 20% by weight based on the amount of the overall polymer electrolyte composition.

3. The polymer electrolyte composition according to claim 1, wherein the organic solvent is selected from a group consisting of ethylene carbonate, propylene carbonate, dimethylcarbonate, diethylcarbonate, ethylmethylcarbonate, tetrahydrofuran, sulforan, 2-methylhydrofuran, and mixtures thereof.

4. The polymer electrolyte composition according to claim 1, wherein the lithium salt is at least one compound selected from a group consisting of $LiPF_6$, $LiClO_4$, $LiAsF_6$, $LiBF_4$, $LiCF_3SO_3$, $LiN(CF_3SO_2)_2$, $LiSCN$, and $LiC(CF_3SO_2)_3$.

5. The polymer electrolyte composition according to claim 1, further comprising at least one additive selected from a group consisting of polyethylene glycol diacrylate (PEGDA), polyethylene glycol dimethacrylate (PEGDMA), and a mixture thereof.

6. The polymer electrolyte composition according to claim 5, wherein said at least one additive is included in an amount in a range of 0.1% to 10% by weight based on the amount of the overall polymer electrolyte composition.

7. The polymer electrolyte composition according to claim 5, wherein the PEGDA is an oligomer having a weight-average molecular weight in a range of 200 to 10000, and the number of ethylene oxides contained in the oligomer is in a range of 3 to 20.

8. The polymer electrolyte composition according to claim 5, wherein the PEGDMA is an oligomer having a weight-average molecular weight in a range of 200 to 10000, and the number of ethylene oxides contained in the oligomer is in a range of 3 to 20.

9. A lithium battery, comprising a cathode, an anode and the polymer electrolyte composition of claim 1.

10. The lithium battery according to claim 9, further comprising a porous separator.

11. The lithium battery according to claim 9, wherein a content of the aromatic compound is substantially in a range of 0.1% to 20% by weight based on the amount of the overall polymer electrolyte composition.

12. The lithium battery according to claim 9, further comprising at least one additive selected from a group consisting of polyethylene glycol diacrylate (PEGDA), polyethylene glycol dimethacrylate (PEGDMA), and a mixture thereof.

13. The lithium battery according to claim 12, wherein a content of said at least one additive is substantially in a range of 0.1% to 10% by weight based on the amount of the overall polymer electrolyte composition.

14. The lithium battery according to claim 12, wherein the PEGDA is an oligomer having a weight-average molecular weight in a range of 200 to 10000, and the number of ethylene oxides contained in the oligomer is in a range of 3 to 20.

15. The lithium battery according to claim 12, wherein the PEGDMA is an oligomer having a weight-average molecular weight in a range of 200 to 10000, and the number of ethylene oxides contained in the oligomer is in a range of 3 to 20.

16. A polymer electrolyte composition, comprising:
an organic solvent;
a lithium salt; and
an aromatic compound of Formula (4).

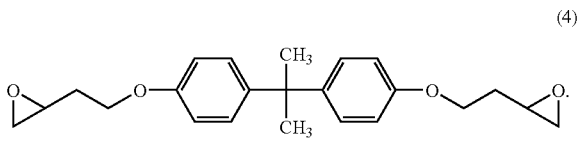

(4)

17. The polymer electrolyte composition according to claim 16, wherein the aromatic compound is included in an amount in a range of 0.1% to 20% by weight based on the amount of the overall polymer electrolyte composition.

18. The polymer electrolyte composition according to claim 16, wherein the organic solvent is selected from a group consisting of ethylene carbonate, propylene carbonate, dimethylcarbonate, diethylcarbonate, ethylmethylcarbonate, tetrahydrofuran, sulforan, 2-methyihydrofuran, and mixtures thereof.

19. The polymer electrolyte composition according to claim 16, wherein the lithium salt is at least one compound selected from a group consisting of $LiPF_6$, $LiClO_4$, $LiAsF_6$, $LiBF_4$, $LiCF_3SO_3$, $LiN(CF_3SO_2)_2$, LiSCN, and $LiC(CF_3SO_2)_3$.

20. The polymer electrolyte composition according to claim 16, further comprising at least one additive selected from a group consisting of polyethylene glycol diacrylate (PEGDA), polyethylene glycol dimethacrylate (PEGDMA), and a mixture thereof.

21. The polymer electrolyte composition according to claim 20, wherein said at least one additive is included in an amount in a range of 0.1% to 10% by weight based on the amount of the overall polymer electrolyte composition.

22. The polymer electrolyte composition according to claim 20, wherein the PEGDA is an oligomer having a weight-average molecular weight in a range of 200 to 10000, and the number of ethylene oxides contained in the oligomer is in a range of 3 to 20.

23. The polymer electrolyte composition according to claim 20 wherein the PEGDMA is an oligomer having a weight-average molecular weight in a range of 200 to 10000, and the number of ethylene oxides contained in the oligomer is in a range of 3 to 20.

24. A lithium battery comprising a cathode, an anode and the polymer electrolyte composition of claim 16.

25. The lithium battery according to claim 24, further comprising a porous separator.

26. The lithium battery according to claim 24, wherein a content of the aromatic compound is substantially in a range of 0.1% to 20% by weight based on the amount of the overall polymer electrolyte composition.

27. The lithium battery according to claim 24, further comprising at least one additive selected from a group consisting of polyethylene glycol diacrylate (PEGDA), polyethylene glycol dimethacrylate (PEGDMA), and a mixture thereof.

28. The lithium battery according to claim 27, wherein a content of said at least one additive is substantially in a range of 0.1% to 10% by weight based on the amount of the overall polymer electrolyte composition.

29. The lithium battery according to claim 27, wherein the PEGDA is an oligomer having a weight-average molecular weight in a range of 200 to 10000, and the number of ethylene oxides contained in the oligomer is in a range of 3 to 20.

30. The lithium battery according to claim 27, wherein the PEGDMA is an oligomer having a weight-average molecular weight in a range of 200 to 10000, and the number of ethylene oxides contained in the oligomer is in a range of 3 to 20.

* * * * *